United States Patent [19]

Shioyama et al.

[11] Patent Number: 5,383,529

[45] Date of Patent: Jan. 24, 1995

[54] GEAR TRAIN ARRANGEMENT OF REAR WHEEL STEERING SYSTEM FOR MOTOR VEHICLE

[75] Inventors: Shuichiro Shioyama; Norihiro Saita, both of Atsugi, Japan

[73] Assignee: Atsugi Unisia Corporation, Atsugi, Japan

[21] Appl. No.: 20,702

[22] Filed: Feb. 22, 1993

[30] Foreign Application Priority Data

Feb. 21, 1992 [JP] Japan ............... 4-007667[U]

[51] Int. Cl.⁶ .............................................. B62D 5/06
[52] U.S. Cl. .................................. 180/140; 180/79.1; 280/91
[58] Field of Search ............... 180/140, 79.1; 280/91; 364/424.05

[56] References Cited

U.S. PATENT DOCUMENTS

| | | | |
|---|---|---|---|
| 4,782,907 | 11/1988 | Morishita et al. | 180/140 |
| 4,813,694 | 3/1989 | Boberg et al. | 280/91 |
| 4,881,613 | 11/1989 | Kanazawa et al. | 180/140 |
| 4,893,688 | 1/1990 | Morishita | 180/79.1 |
| 5,101,922 | 4/1992 | Ohmura | 180/79.1 |
| 5,168,948 | 12/1992 | Rohringer et al. | 180/140 |
| 5,207,287 | 5/1993 | Sano et al. | 180/140 |
| 5,219,035 | 6/1993 | Tsurumiya et al. | 180/79.1 |

FOREIGN PATENT DOCUMENTS 3-86882 3/1991 Japan ..................... 180/140

*Primary Examiner*—Kenneth R. Rice
*Assistant Examiner*—Christopher P. Ellis
*Attorney, Agent, or Firm*—Foley & Lardner

[57] ABSTRACT

A gear train of a rear wheel steering arrangement for an automotive vehicle includes a worm gear which is driven by a motor to steer rear wheels. The worm gear is designed to exhibit a reverse rotation efficiency more than zero so that when reverse torque is transmitted from a worm wheel to a worm, the worm is allowed to rotate in a reverse direction.

3 Claims, 3 Drawing Sheets

GEAR TRAIN ARRANGEMENT OF REAR WHEEL STEERING SYSTEM FOR MOTOR VEHICLE

BACKGROUND OF THE INVENTION

1. Field of The Invention

The present invention relates generally to a rear wheel steering system for an automotive vehicle and more specifically to an improvement in a gear train for steering rear wheels.

2. Description of The Prior Art

Japanese Utility Model First Publication No. 3-86882 discloses a gear train arrangement of a rear wheel steering system for an automotive vehicle. This gear train includes a worm gear and stopper pins. The worm gear is driven by a D.C. motor and coupled with tie rods to which rear wheels are rotatably attached. The stopper pins restrict rotational movement of a worm wheel over a preselected steering angle range. The worm gear is designed to assume a reverse rotation efficiency less than zero for restricting displacement of tie rods caused by external force acting on tile rear wheels. In operation, the system monitors a steered angle of the front wheels and vehicle speed to determine a rear wheel steering target angle according to a preselected algorithm. The system further detects an actual steered angle of the rear wheels to control rear wheel steering operation so as to compensate for the difference between tile actual steered angle and tile target angle.

The above prior art gear train of the rear wheel steering system has, however, suffered from certain drawbacks, in that when the D.C. motor overruns due to a malfunction of the system, for example, the worm wheel is urged to rotate into contact with either of the stopper pins, thereby causing excessive torque to act on the stopper pin due to the inertial torque of the motor or so forth. This results in tight engagement between a worm and the worm wheel due to a reaction force caused by elastic deformation of the stopper pin. Therefore, returning the rear wheels to a neutral position where a steered angle is zero requires a higher torque of the motor.

SUMMARY OF THE INVENTION

It is therefore a principal object of the present invention to avoid the disadvantages of the prior art.

It is another object of the present invention to provide an improved gear arrangement including a one-way gear train for a rear wheel steering system which is responsive to reverse torque input from an output gear to allow an input gear to rotate in a reverse direction for preventing tight engagement due to reaction force from a stopper even when a driving motor overruns due to a malfunction in the system thereby urging the output gear into engagement with the stopper.

According to one aspect of the present invention, there is provided a rear wheel steering apparatus for an automotive vehicle which comprises a motor, a one-way gear train including input and output gears, the input gear being in drive connection with the motor and responsive to torque from the motor to rotate in a normal direction for transmitting the torque to the output gear, a steering member connected to the output gear for steering Fear wheels of the vehicle, and a means responsive to reverse torque acting on the input gear through the output gear for allowing the input gear to rotate in a reverse direction.

According to another aspect of the present invention, there is provided a rear wheel steering apparatus for an automotive vehicle which comprises a motor, a worm gear including a worm and a worm wheel, the worm being in drive connection with the motor and responsive to torque from the motor to rotate in a normal direction for transmitting the torque to the worm gear, a stopper means for restricting rotational movement of the worm wheel over a preselected angle range, a steering member connected to the worm wheel for steering rear wheels of the vehicle, and a means responsive to reaction force from the stopper means when the worm wheel is urged to engage the stopper means for allowing the worm to rotate in a reverse direction.

In the preferred mode, the means for allowing the reverse rotation of the worm is such that reverse rotation efficiency of the worm gear is set to more than zero. Alternatively, the means is such that the worm wheel is provided with helical gear teeth, a rotational axis of the worm being oriented at a preselected angle with respect to a line perpendicular to a rotational axis of the worm wheel.

BRIEF DESCRIPTION OF THE DRAWINGS

The present invention will be understood from the detailed description given hereinbelow and from the accompanying drawings of the preferred embodiments which are given for explanation and understanding only and are not intended to imply limitations to the invention.

In the drawings.

DESCRIPTION OF THE PREFERRED EMBODIMENT

Figure 1:
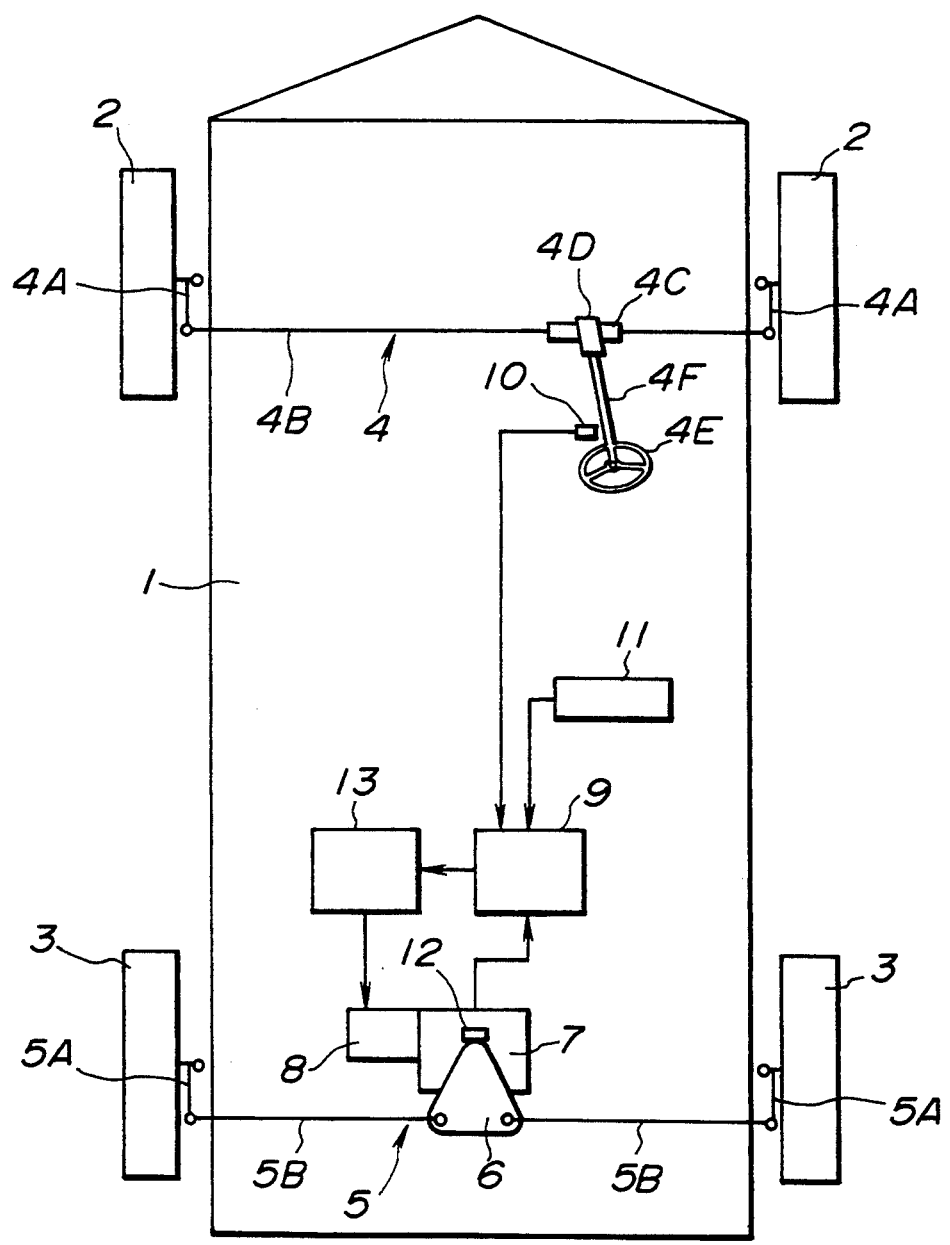
FIG. 1 is a schematic view which shows a steering system including a rear wheel steering arrangement according to the present invention.

Referring now to the drawings, particularly to FIG. 1, there is shown a steering control system for an automotive vehicle according to the present invention. This steering control system includes generally a front wheel steering mechanism 4 and a rear wheel steering mechanism 5.

The front wheel steering mechanism 4 includes right and left knuckle arms 4A, a tie rod 4B connected to the knuckle arms 4A for steering front wheels 2, a rack 4C attached to the tie rod 4B, a pinion 4D meshing with the rack 4C, and a steering wheel 4E. The steering torque from the steering wheel 4E is transmitted to the rack 4C through a steering shaft 4F which, in turn, is transmitted to the tie rod 4B.

The rear wheel steering mechanism 5 includes right and left knuckle arms 5A and right and left tie rods 5B. The tie rods 5B arc linked to each other by a linkage plate 6 which is driven by a gear box 7 which includes a one-way gear train (as will be described hereinafter in detail). A reversible D.C. motor 8 and a driver 13 are connected to the gear box 7 for steering rear wheels 3.

The steering system further includes a control unit 9 which is provided with a microcomputer, a front wheel steering angle sensor 10, a vehicle speed sensor 11, and a rear wheel steering angle sensor 12. The front wheel steering angle sensor 10 is mounted on a portion of the steering shaft 4F for monitoring a steered angle of the steering wheel 4E to provide a signal indicative thereof. The vehicle speed sensor 11 detects vehicle speed to provide a signal indicative thereof. The rear wheel steering angle sensor 12 detects a rotational angle of an output shaft of the gear box 7. The control unit 9 is responsive to the signals from the sensors 10, 11, and 12 to provide a control signal to the D.C. motor 8 through the driver 13.

Figure 2:
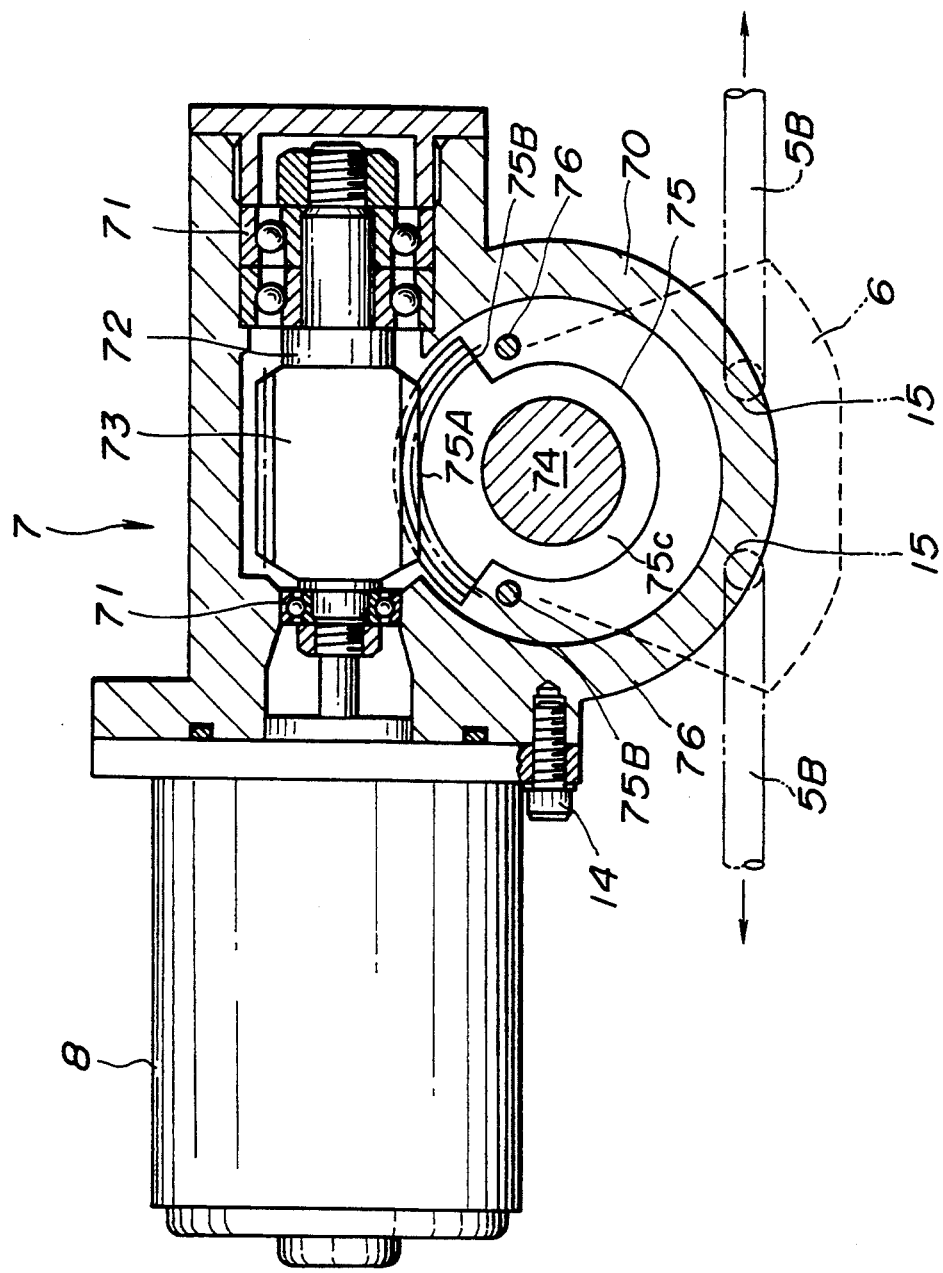
FIG. 2 is a sectional view which shows a gear train of a rear wheel steering arrangement.

Referring to FIG. 2, the gear train for steering the rear wheels is shown.

The gear box 7 includes a housing 70 fixedly attached to a vehicle body 1. The reversible D.C. motor 8 is secured to the housing 70 by bolts 14 and is mechanically connected to an input shaft 72. The input shaft 72 is rotatably supported in the housing 70 by ball bearings 71. A worm 73 is formed on a portion of the shaft 72 in mesh with a worm wheel 75 which is supported by a worm wheel shaft 74 rotatably arranged in the housing 70. The worm wheel 75 includes a large diameter section 75A on which gear teeth are formed, a small diameter cylindrical section 75C, and stepped portions 75B.

On the worm wheel shaft 74, the linkage plate 6 is fixedly mounted in the illustrated manner which, in turn, is linked to the tie rods 5B through ball joints 15. The rotation of the worm wheel 75 causes the linkage plate 6 to swing for steering the rear wheels 3 at a preselected angle.

Pins 76 are press-fitted into an inner wall of the housing 70 at certain positions between circumferences of the large and small diameter sections 75A and 75C. These pins 76 serve as a stopper to prevent the worm wheel 75 from rotating beyond a preselected range for defining a maximum displacement of the linkage plate 6, or maximum steering angle of the rear wheels 3.

In this embodiment according to the present invention, tile engagement between the worm 73 and the worm wheel 75 is established so as to assume a reverse rotation efficiency more than zero in the following manner.

The worm wheel 75 is formed with helical teeth thereon so that tooth trace is oriented at a preselected angle with respect to the center line of the worm wheel shaft 74. Additionally, tile input shaft 72 is so oriented that a tooth surface of the worm 73 suitably engages that of the worm wheel 75. In other words, the input shaft 72 is supported rotatably by the ball bearings 71 so that the center line of the input shaft 72 extends at a preselected angle, for example, the same angle as an inclination of the helical teeth of the worm wheel 75 with respect to a line perpendicular to the center line of tile worm wheel shaft 74. With these arrangements, a reverse rotation efficiency of more than zero is established which allows tile worm 73 to rotate in a reverse direction when reverse torque is transmitted from the worm wheel 75.

In operation, when a driver turns the steering wheel 4E, tile control unit 9 is responsive to the signals from the steering angle sensor 10 and the vehicle speed sensor 11 to determine a rear wheel steering target angle in a preselected relation to a steered angle of the front wheels and vehicle speed, and provides a control signal to the driver 13. The driver 13 then amplifies voltage of the control signal to output a drive signal of direct current to the D.C. motor 8 so that the worm 73 rotates at a preselected angle. The rotation of the worm 73 then causes the worm wheel 75 to rotate, thereby moving the linkage plate 6 for displacing the tie rods 5B in a phase opposite or similar to a steered angle of the front wheels.

When the D.C. motor overruns due to a malfunction of the system, for example, the worm wheel 75 is urged to rotate beyond the preselected range so that either of the stepped portions 75B is biased against the pin 76, causing the worm 73 and the worm wheel 75 to engage tightly with each other due to a reaction force caused by elastic deformation of the p in 76. The D.C. motor is thus overloaded. The system is then responsive to the overload of the D.C. motor 8 to shut off the power of the motor, allowing the motor to rotate freely. Therefore, the reaction force from the pin 76 causes the worm wheel 75 to rotate in a reverse direction to return the worm 73 by an angle assured by the above described reverse rotation efficiency of more than zero to relieve the tight engagement between the worm 73 and the worm wheel 75. It will be appreciated that the system may rotate the D.C. motor in the reverse direction with normal current to return the rear wheels 3 to a neutral position where a rear wheel steered angle is zero.

Figure 3:
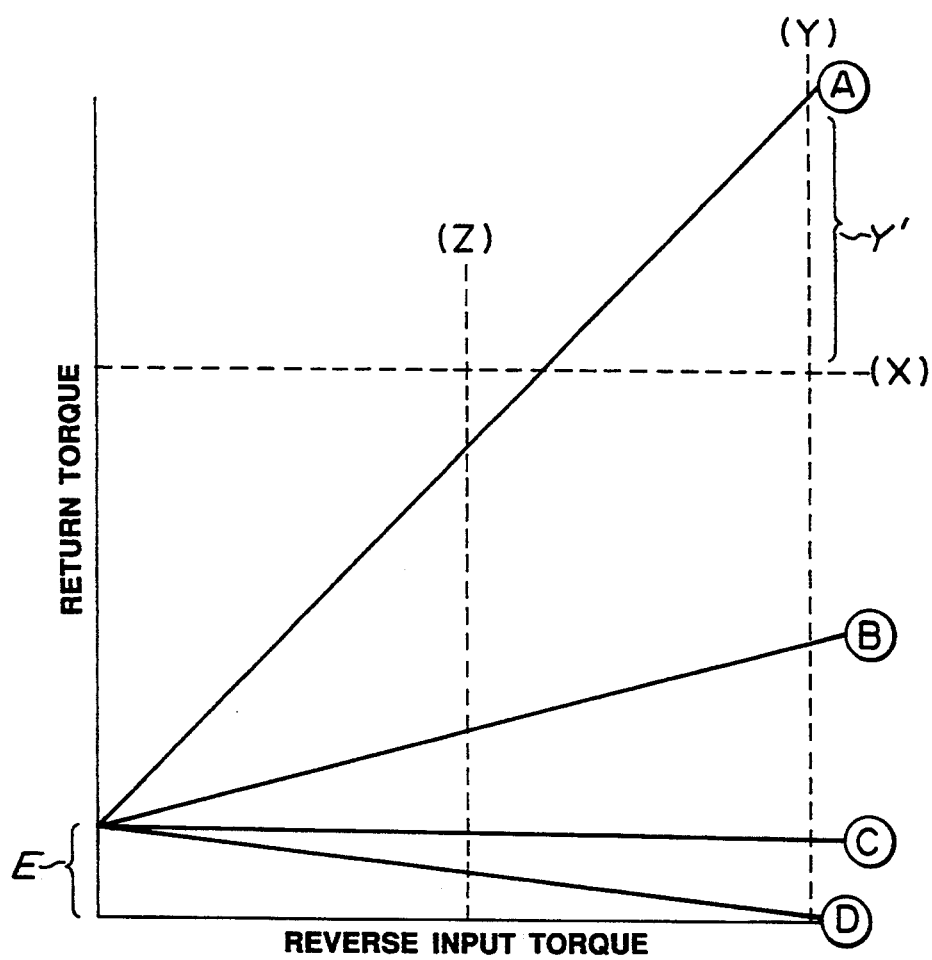
FIG. 3 is a graph which shows the relation between reverse input torque acting on a worm and return torque required for driving a motor in a reverse direction.

Referring to FIG. 3, there is shown the relationship between reverse input torque acting on the worm 73 and return torque required for driving the motor 8 in a reverse direction. The line A indicates characteristics in the case of a greater negative reverse rotation efficiency. The line B indicates characteristics in the case of a smaller negative reverse rotation efficiency. The line C indicates characteristics in the case of a reverse rotation efficiency of about zero. The line D indicates characteristics in the case of a positive reverse rotation efficiency more than zero. The broken line X indicates an upper limit of controlled torque of the D.C. motor 8. The broken line Y indicates a reaction force exerted from the pins 76 on the stepped portions 75B when the D.C. motor 8 overruns. The broken line Z indicates a normal reverse input torque when the system is in normal operation. The E indicates a friction torque.

It will be noted that the reverse rotation efficiency less than zero serves to restrict an input gear (i.e., the worm 73) from rotating in a reverse direction against reverse torque input from an output gear (i.e., the worm wheel 75), therefore, a torque required for releasing tight engagement between the input and output gears to return the input gear to a neutral position is dependent upon degrees of the reverse rotation efficiency and the reverse torque input acting on the input gear. With negatively increased reverse rotation efficiency, a greater return torque for driving the input gear in a reverse direction becomes necessary. Accordingly, when the reverse rotation efficiency is too great as shown by the line A, there may be a range Y' where the D.C. motor cannot return the worm 73 to the neutral position due to a lack of output torque. On the other hand, in this embodiment, the reverse rotation efficiency is, as already mentioned, greater than zero. Thus, reverse torque acting on the worm wheel 75 due to reaction force from the pins 76 causes the worm 73 to rotate in a reverse direction, releasing the undesirable load acting on the pin 76. The D.C. motor 8 may then be controlled with normal current to reverse the worm 73 to the neutral position.

While the present invention has been disclosed in terms of the preferred embodiment in order to facilitate better understanding thereof, it should be appreciated that the invention can be embodied in various ways without departing from the principle of the invention.

Therefore, the invention should be understood to include all possible embodiments and modification to the shown embodiments which can be embodied without departing from the principle of the invention as set forth in the appended claims.

What is claimed is:

1. A rear wheel steering apparatus for an automotive vehicle, comprising:

a motor;

a gear train including input and output gears, said input gear being in drive connection with said motor and responsive to torque from said motor to rotate in a normal direction for transmitting the torque to said output gear; and a steering member connected to said output gear for steering rear wheels of the vehicle; and means responsive to a reverse torque acting on said input gear through said output gear for allowing said input gear to rotate in a reverse direction;

said gear train having a reverse rotation efficiency which is higher than zero.

2. A rear wheel steering apparatus for an automotive vehicle, comprising:

a motor;

a worm gear including a worm and a worm wheel, said worm being in drive connection with said motor and responsive to torque from said motor to rotate in a normal direction for transmitting the torque to said worm gear;

stopper means for restricting rotational movement of said worm wheel over a preselected angle range; and a steering member connected to said worm wheel for steering rear wheels of the vehicle; and means responsive to reaction force from said stopper means when said worm wheel is urged to engage the stopper means for allowing said worm to rotate in a reverse direction;

said worm gear having a reverse rotation efficiency which is higher than zero.

3. A rear wheel steering apparatus as set forth in claim 2, wherein said worm wheel is provided with helical gear teeth, a rotational axis of said worm being oriented at a preselected angle with respect to a line perpendicular to a rotational axis of said worm wheel.

* * * * *